United States Patent [19]

Melocik et al.

[11] Patent Number: 4,567,757
[45] Date of Patent: Feb. 4, 1986

[54] APPARATUS AND METHOD FOR TESTING VEHICLE BRAKES

[75] Inventors: Grant C. Melocik, Chardon; John E. Wible, Painesville, both of Ohio

[73] Assignee: Towmotor Corporation, Mentor, Ohio

[21] Appl. No.: 713,360

[22] Filed: Mar. 18, 1985

[51] Int. Cl.$^4$ .............................................. G01L 5/28
[52] U.S. Cl. ....................................... 73/129; 364/426
[58] Field of Search ......................... 73/121, 126, 129; 364/424, 426

[56] References Cited

U.S. PATENT DOCUMENTS 4,337,651 7/1982 Yoshino et al. ....................... 73/129
4,340,935 7/1982 Anlauf et al. ....................... 73/121 X Primary Examiner—Jerry W. Myracle
Attorney, Agent, or Firm—Stephen L. Noe

[57] ABSTRACT

The subject brake test apparatus operates in conjunction with a vehicle having a source of power, a traction motor controllably connected to the power source and to at least one vehicle wheel, and a vehicle brake associated with at least one vehicle wheel. An actuator controllably engages and disengages the vehicle brake in response to receiving respective brake control signals, and a transducer produces wheel rotation signals in response to rotation of at least one of the vehicle wheels. A processor controllably delivers a brake engaging signal to the actuator and engages the vehicle brake. A predetermined amount of power from the power source is delivered to the traction motor for a predetermined period of time. In response to receiving wheel rotation signals from the transducer, the processor determines the degree of rotation of the vehicle wheels during at least a predetermined portion of the period of time that the traction motor is energized, and produces a brake status signal in response to amount of rotation of the vehicle wheels. The brake test apparatus advantageously produces an objective result, and is fully automatic in operation. Therefore, it is particularyl well suited to use on unmanned vehicles.

9 Claims, 5 Drawing Figures

APPARATUS AND METHOD FOR TESTING VEHICLE BRAKES

DESCRIPTION

1. Technical Field

This invention relates generally to an apparatus and method for testing vehicle brakes, and, more particularly, to an apparatus and method for controllably testing the brakes of a wheeled vehicle and producing a brake status signal in response to the condition of the brakes.

2. Background Art

Virtually all motor vehicles in use today include some type of associated braking apparatus, typically consisting of either disc or drum type mechanical brakes associated with one or more wheels of the vehicle. The brakes can be mechanically, hydraulically, or electrically actuated, and typically include some sort of friction material that is placed in contact with a rotating member of the vehicle in order to produce sufficient friction to bring the vehicle to a stop. The braking apparatus is subject to various conditions that can result in less than desirable braking. For example, the friction material can wear to the extent that it no longer produces sufficient friction to stop the vehicle within a recommended distance, or electrical and hydraulic failures can cause costly delays.

In the case of an operator controlled vehicle, for example, a typical industrial lift truck, degradation of the braking system is quickly detected by the operator, and appropriate maintenance procedures can be instituted. However, today's manufacturing operations are demanding the provision of unmanned vehicles for particular applications. For example, in the material handling area, unmanned vehicles can be used advantageously to move materials from one point to another throughout an industrial facility. Such unmanned vehicles are typically controlled by one or more on-board computer systems, often in conjunction with a stationary master computer system. The master and on-board computers communicate with one another via some type of link, for example, radio transceivers.

In the case of such unmanned vehicles, it is particularly important that the associated braking systems be maintained in satisfactory operating condition. However, it is difficult to objectively determine the condition of vehicle brakes at a particular time without the intervention of an operator. Therefore, in order to realize the potential of unmanned vehicles, it is necessary that a test be developed for vehicle brakes that can be performed automatically at frequent intervals by the vehicle computer systems.

The present invention is directed to overcoming one or more of the problems as set forth above.

DISCLOSURE OF THE INVENTION

In one aspect of the present invention, an apparatus for controllably testing the brakes of a wheeled vehicle is provided. The vehicle includes a source of motive power, a traction motor controllably connected to the power source and to at least one vehicle wheel, and a vehicle brake associated with at least one vehicle wheel. Transducer means is provided for producing wheel rotation signals in response to rotation of at least one of the vehicle wheels, and actuator means is provided for controllably engaging and disengaging the vehicle brake in response to receiving respective brake engaging and disengaging control signals. Processor means is provided for receiving a brake test command signal, responsively controllably producing the brake engaging and disengaging control signals, and delivering the brake engaging signal to the actuator means to engage the vehicle brake. The processor means controllably supplies a predetermined amount of power from the power source to the traction motor for a predetermined period of time. The processor means receives wheel rotation signals produced by the transducer means and determines the degree of rotation of the vehicle wheel during a predetermined portion of the predetermined period of time. Finally, the processor means produces a brake status signal in response to the determined degree of rotation of the vehicle wheels.

In a second aspect of the present invention, a method for controllably testing the brakes of a wheeled vehicle is provided. The vehicle includes a source of motive power, a traction motor controllably connected to the power source and to at least one vehicle wheel, a vehicle brake associated with at least one vehicle wheel, and a wheel rotation transducer connected to at least one vehicle wheel. The method comprises the steps of engaging the vehicle brake and supplying a predetermined modulated amount of power from the power source to the traction motor to produce a predetermined amount of motor torque. First and second wheel rotation signals from the wheel rotation transducer are received and stored at first and second predetermined times. The stored first and second wheel rotation signals are then used to calculate the angle through which the vehicle wheel rotates during the interval between receiving the first and second wheel rotation signals. Finally, a first brake status signal is produced in response to the rotation angle being less than a predetermined amount, and a second brake status signal is produced in response to the rotation angle being equal to or greater than, i.e., not less than, the predetermined amount.

The present invention produces objective vehicle brake tests that are capable of being carried out automatically by an on-board vehicle computer system. The testing procedure can be carried out at predetermined intervals, for example, prior to moving the vehicle following a cold start up, or can be performed upon command from a master computer system or a manual test input.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
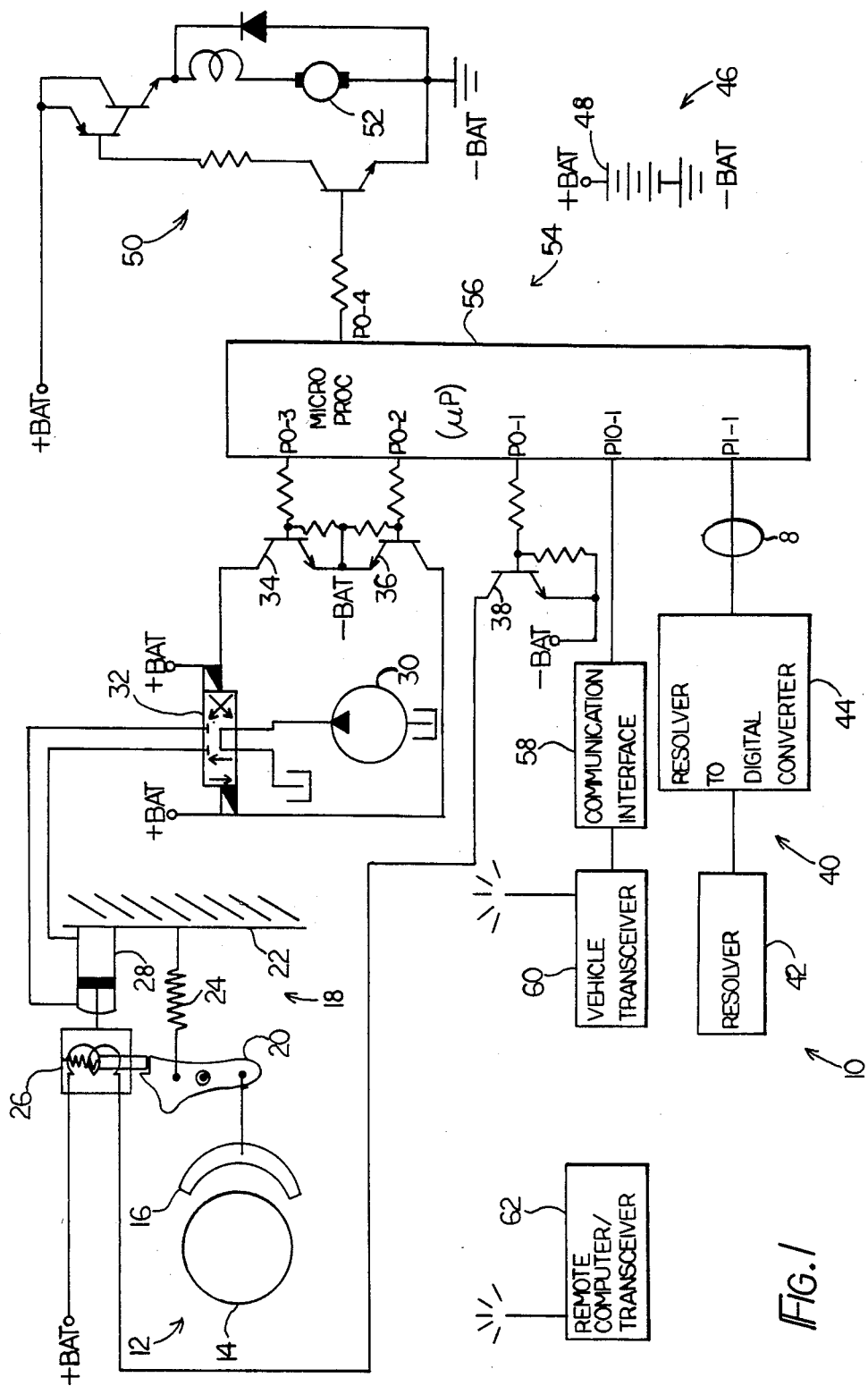
FIG. 1 is a simplified schematic representation of one embodiment of the present invention.

Referring to FIG. 1, an apparatus embodying certain of the principles of the present invention is generally indicated by the reference numeral 10. It should be understood that the following detailed description relates to the preferred embodiment of the apparatus 10. However, the apparatus 10 can assume numerous other embodiments, as will become apparent to those skilled in the art, without departing from the appended claims.

FIG. 1 is a simplified schematic representation of one embodiment of the present invention, and includes necessary elements of a typical vehicle. A vehicle brake 12 includes a brake drum 14, brake pad 16, and actuator means 18. The actuator means 18 includes, for example, a bell crank 20 pivotally connected between the brake shoe 16 and a stationary portion 22 of the vehicle. The bell crank 20 is biased by a spring 24 in such a manner as to normally engage the brake shoe 16 with the brake drum 14. A solenoid 26 is connected to the piston of a hydraulic cylinder 28. The solenoid 26 controllably engages and disengages the vehicle brake 12 in response to the status of the solenoid 26, and to the position of the piston of the hydraulic cylinder 28.

Movement of the hydraulic cylinder piston is responsive to the flow of hydraulic fluid from a hydraulic pump 30 through a directional shuttle valve 32. The direction of flow of the hydraulic fluid is controlled by electrically biasing the shuttle valve 32 in one direction or another in response to the conduction of one or the other of a pair of transistors 34,36. Energization of the solenoid 26 is controlled by the status of an additional transistor 38.

The apparatus 10 also includes transducer means 40 for producing wheel rotation signals in response to rotation of at least one of the vehicle wheels. The transducer means 40 includes, for example, a resolver 42 connected to one of the vehicle wheels, and a resolver to digital converter 44 connected to the resolver.

The vehicle also includes a source of power 46, for example, a battery 48. A power drive switch 50, for example, a plurality of power transistors, is serially connected between the battery 48 and a traction motor 52. The traction motor 52 is, in turn, associated with one or more drive wheels of the vehicle.

Processor means 54 is, for example, a microprocessor 56 of the type commonly commerically available today. The microprocessor 56 can be solely dedicated to the apparatus 10, or, advantageously can be a portion of an overall vehicle control computer system. The processor means 54 includes a plurality of input and output ports connected to the various peripheral devices. For example, an input port PI-1 is connected to the resolver to digital converter 44. A first output port PO-1 is connected to the solenoid drive transistor 38. Likewise, output ports PO-2 and PO-3 are respectively connected to the shuttle valve drive transistors 36,34. A fourth output port PO-4 is connected to the drive motor power switch 50.

Finally, in one embodiment of the present invention, the processor means 54 includes an input/output port PIO-1 connected through a suitable communications interface 58 to a vehicle transceiver 60. The vehicle transceiver 60 is, for example, a conventional radio frequency transmitter and receiver. A corresponding remote computer transceiver 62 can be provided to facilitate communication between the processor means 54 and a remote master computer system.

INDUSTRIAL APPLICABILITY

FIGS. 2-5 are a flowchart of software intended to be utilized with the embodiment of the invention illustrated in FIG. 1. The described software is specifically intended to be used in conjunction with the processor means 54. Operation of the apparatus 10 is best described in relation to its use on a vehicle, for example, an unmanned industrial vehicle. Throughout the following discussion of the software program of FIGS. 2-5, it will be helpful to make reference to associated hardware elements shown on FIG. 1.

The software program described in FIGS. 2-5 enables the processor means 54 to perform at least the following functions. The processor means 54 produces the brake engaging and disengaging control signals and delivers the brake engaging control signal to the actuator means 18, thus engaging the vehicle brake 12. The processor means 54 then controllably supplies a predetermined modulated amount of power from the power source 46 to the traction motor 52, thus producing a predetermined amount of motor torque at the vehicle wheels. A first wheel rotation angle signal is received from the transducer means 40 after a first predetermined period of time has elapsed following the application of power from the power source 46, and the received wheel rotation angle signal is stored in a predetermined computer register. A second wheel rotation angle signal is received from the transducer means 40 after a second predetermined period of time has elapsed, and is likewise stored in a predetermined computer register.

The processor means 54 utilizes the stored first and second wheel rotation angle signals to calculate the rotation angle through which the vehicle wheel rotates during the interval between receiving the first and second wheel rotation signals. The processor means 54 then produces a first brake status signal in response to the calculated rotation angle being less than a predetermined amount, for example, 10 degrees, and produces a second brake status signal in response to the calculated rotation angle being equal to or greater than the predetermined amount.

Figure 2:
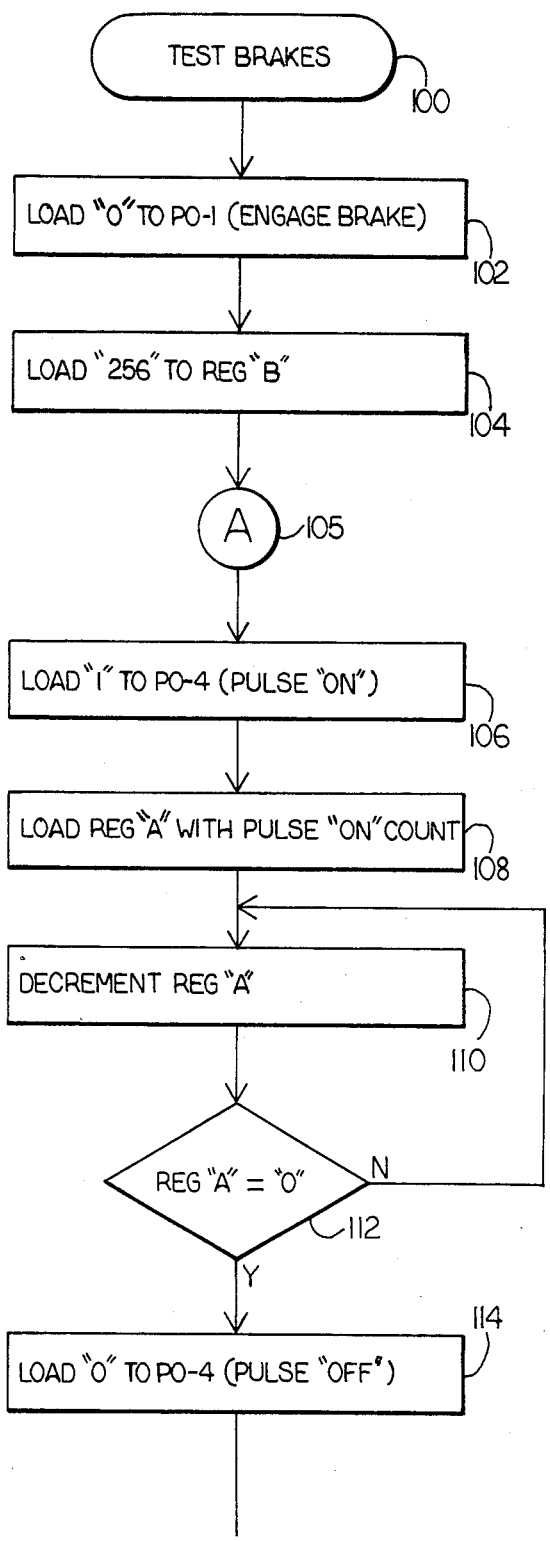
FIGS. 2-5 are a flowchart of software used with one embodiment of the present invention.
Figure 3:
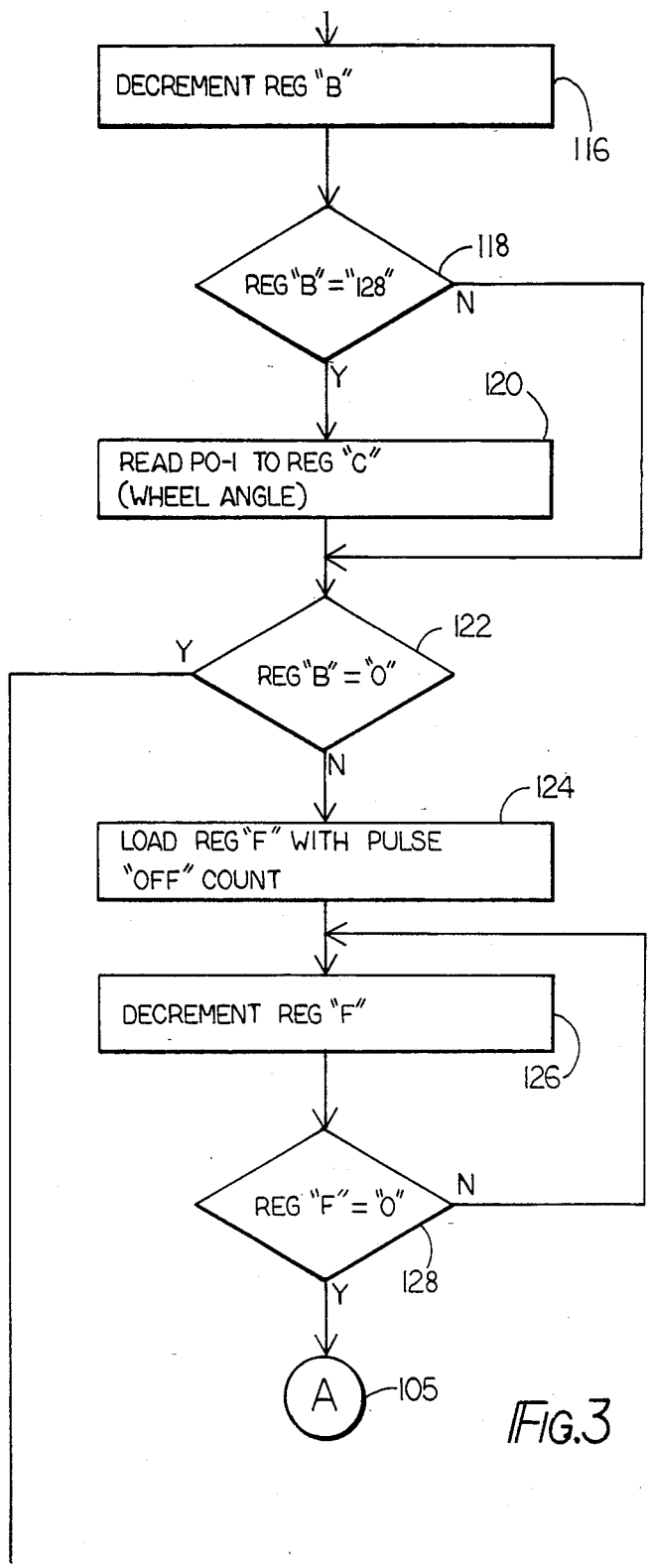
Figure 4:
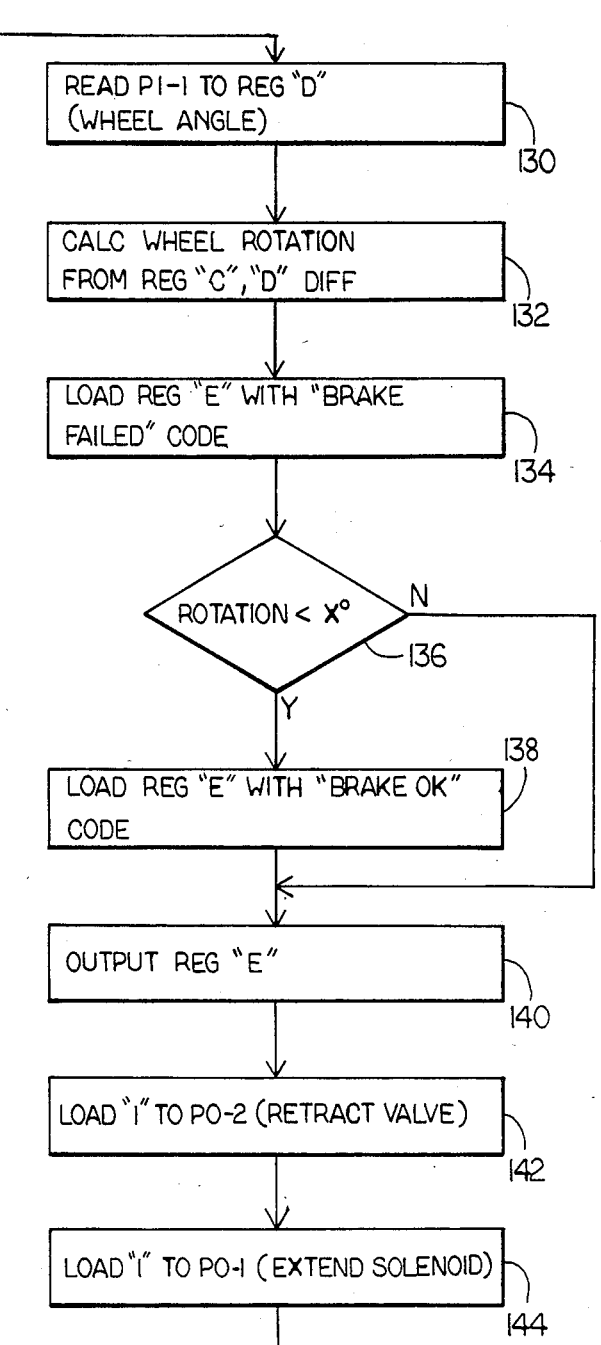
Figure 5:
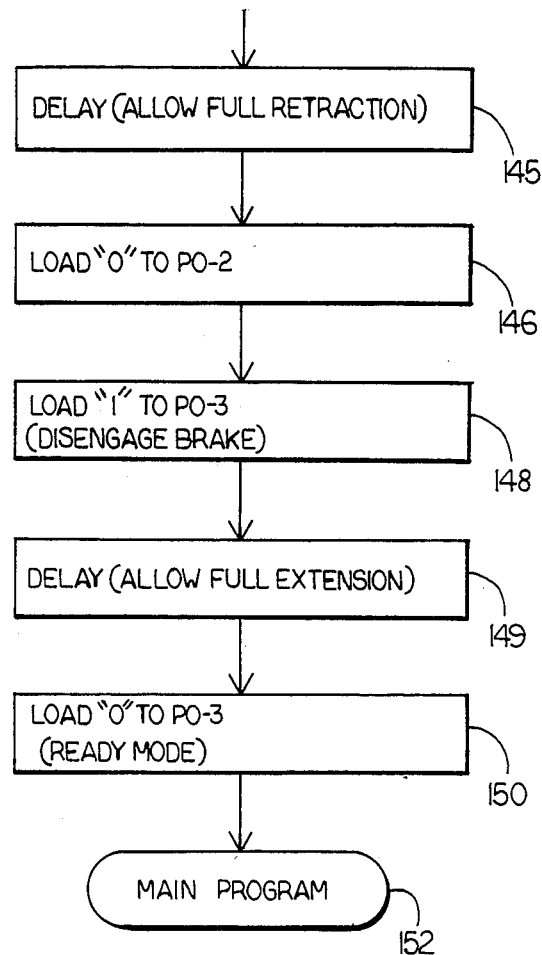

A specific implementation of the software program begins at the block 100 on FIG. 2. Block 100 is the starting point for the software routine that implements the automatic brake test. In a preferred embodiment of the present invention, the software routine beginning at block 100 is initiated by the processor means 54 in response to receiving a brake test command signal remotely generated by a master command computer system, transmitted from the remote computer transceiver 62 to the vehicle transceiver 60, and delivered to port PIO-1 through the communication interface 58.

In block 102 a logic "0" is output by the processor means 54 at port PO-1. This signal causes the transistor 38 to turn "off", de-energizing the solenoid 26. The plunger of solenoid 26 is responsively retracted from the bell crank 20 by the conventional internal solenoid spring, causing the brake shoe 16 to engage the brake drum 14.

Activities within the processor means 54 typically occur in conjunction with specific memory registers, designated by alphanumeric symbols in the following discussion. In block 104 the literal number or count "256" is entered into register "B". Block 105 is simply an entry point into the flow of the computer program, and is referenced later in the program.

In block 106 a logic "1" is delivered to port PO-4. This turns "on" the drive motor switch means 50, and begins the process of supplying power from the power source 46 to the traction motor 52. Register "A" is next loaded with a predetermined pulse "on" count in the block 108, and is then decremented by one in the block 110. Register "A" is then checked in block 112 to determine if it has counted down to the number "0", and if not, a loop is entered until such time as register "A" does equal "0". Once register "A" is found to equal "0" in block 112, a logic "0" is delivered to port PO-4 in block 114. This turns off the supply of power to the motor 52, and register "B" is decremented by one in block 116.

In block 118, register "B" is checked to determine if it equals the number "128". If so, the value presented at port PI-1 from the resolver to digital converter 44 is read into register "C" in block 120. Register "B" is then checked to see if it equals the number "0" in block 122. If, in block 118, register "B" does not equal "128", control passes immediately to test block 122. If register "B" does not equal "0" in block 122, register "F" is loaded with the pulse "off" count in block 124. Register "F" is then decremented by one in block 126 and tested in block 128 to see if it equals "0". If not, register "F" continues to decrement in block 126 until such time as it does equal "0". Control then passes back to the entry point designated as block 105. If register "B" does equal "0" in block 122, control passes to block 130 where the value from the resolver to digital converter 44 is again read at port PI-1 and is stored in register "D".

Wheel rotation is next calculated in block 132, utilizing the values previously stored in registers "C" and "D". In block 134, register "E" is loaded with a "check brake" status code and program control passes to block 136. If the wheel rotation calculated in block 132 is found to be less than a predetermined number of degrees in block 136, register "E" is reloaded with a "brake okay" status code in block 138. If the calculated wheel rotation is equal to or greater than a predetermined amount, control passage directly from block 136 to block 140. In either event, the status code contained in register "E" is output as a signal in block 140. In the preferred embodiment shown in FIG. 1, the brake status signal is delivered to port PI-1, and then to the communications interface 58. An electromagnetic representation of the status signal is then transmitted by the vehicle transceiver 60 and is received by the master remote computer transceiver 62. Thus, the master remote computer control system is provided with status information concerning the condition of the vehicle brakes. Such information is useful, for example, in avoiding situations caused by worn brakes, and in evaluating the need for vehicle maintenance.

The brake status signal can be used in numerous other ways. For example, the status signal can activate various warning devices associated with the vehicle, such as a flashing light or audible signal, or can be utilized to disable further operation of the vehicle until some prescribed action is taken.

In any event, with the brake test completed, a logic "1" signal is delivered to port PO-2 in block 142. Responsively, the transistor 36 is energized and the shuttle valve 32 is shifted to supply hydraulic fluid from the pump 30 to the hydraulic cylinder 28. This causes the piston of the cylinder 38 to retract, moving the solenoid 26 away from engagement with the bell crank 20. The delay in block 145 insures time for full retraction of the piston. A logic value "1" is next delivered to port PO-1 in block 144, causing the solenoid plunger to again extend. In block 146, a logic "0" is delivered to port PO-2 and a logic "1" to port PO-3 in block 148. Responsively, the transistor 36 is turned "off" and the transistor 36 is turned "on", again shifting the shuttle valve 32 and reversing the flow of hydraulic fluid from the pump 30 to the hydraulic cylinder 38. Responsively, the solenoid 26 is moved against the bell crank 20 causing the spring 24 to extend and removing the brake shoe 16 from contact with the brake drum 14. The delay in block 149 insures time for full release of the brake. Finally, in block 150, a logic "0" is delivered to port PO-3, causing the shuttle valve 32 to assume the centered or neutral position, and maintaining the vehicle brake 12 in the disengaged position. The main vehicle control software program is then reentered at block 152.

It will be appreciated by those skilled in the art that it is not essential to incorporate all of the steps represented in the flowchart of FIGS. 2–5 in a given system. Nor is it necessary to implement the steps 2–5 utilizing a programmed microprocessor. However, such an implementation is deemed to be the best mode of practicing the invention owing to the broad and widespread availability of suitable microprocessors, the widespread understanding of programming techniques for microprocessors, the cost reduction in microprocessor circuitry which has been realized in recent years, and the flexibility afforded by utilizing a programmable device. It will also be appreciated that various other elements in the embodiment described in FIG. 1 can be replaced by functionally equivalent elements. For example, the vehicle brake 12 and actuator means 18 can be replaced by a suitable electric brake system. In exchange for the increase in price, the system would thus be simplified by eliminating the need for hydraulic elements and the mechanical bell crank 20 and associated devices. Likewise, the resolver 42 and resolver to digital converter 44 can be replaced by other suitable wheel transducers. It is considered that such alterations or substitutions can be implemented without departing from the appended claims.

Other aspects, objects, advantages and usage of this invention can be obtained from a study of the drawings, the disclosure, and the appended claims.

We claim:

1. Apparatus for controllably testing the brakes of a wheeled vehicle in response to receiving a brake test command signal, said vehicle having a source of power, a traction motor controllably connected to said power source and to at least one vehicle wheel, and a vehicle brake associated with at least one vehicle wheel, comprising:

transducer means for producing wheel rotation signals in response to rotation of at least one of said vehicle wheels;

actuator means for controllably engaging and disengaging said vehicle brake in response to receiving respective brake engaging and disengaging control signals; and processor means for receiving said brake test command signal and responsively producing said brake engaging control signal, delivering said brake engaging control signal to said actuator means and engaging said vehicle brake, controllably supplying a predetermined amount of power from said power source to said traction motor for a predetermined period of time, receiving said wheel rotation signals from said transducer means and determining the degree of rotation of said vehicle wheels during a predetermined portion of said predetermined period of time, and producing a brake status signal in response to said determined degree of rotation of said vehicle wheels.

2. Apparatus, as set forth in claim 1, wherein said power delivered from said power source to said traction motor is controllably modulated to produce a predetermined magnitude of traction motor torque.

3. Apparatus, as set forth in claim 1, wherein said processor means produces a first vehicle brake status signal in response to the degree of rotation of said vehicle wheels during said predetermined portion of said predetermined period of time being less than a predetermined amount, and a second vehicle brake status signal in response to the degree of rotation of said vehicle wheels during said predetermined portion of said predetermined period of time being not less than said predetermined amount.

4. Apparatus, as set forth in claim 1, wherein said transducer means includes a rotary resolver and resolver to digital converter associated with one of said wheels and adapted to produce digital signals responsive to the angular rotation of said wheel.

5. Apparatus, as set forth in claim 1, wherein said vehicle includes electromagnetic signal transmitting and receiving means for receiving a remotely generated brake test command signal, responsively delivering said brake test command signal to said processor means, receiving said brake status signal from said processor means, and responsively transmitting said brake status signal as an electromagnetic signal.

6. Apparatus for controllably testing the brakes of a wheeled vehicle in response to receiving a brake test command signal, said vehicle having a source of power, a traction motor controllably connected to said power source and to at least one vehicle wheel, and a vehicle brake associated with at least one vehicle wheel, comprising:

transducer means for producing angular wheel rotation signals in response to rotation of at least one of said vehicle wheels;

actuator means for controllably engaging and disengaging said vehicle brake in response to receiving respective brake engaging and disengaging control signals; and processor means for receiving said brake test command signal and responsively producing said brake engaging control signal;

delivering said brake engaging control signal to said actuator means and engaging said vehicle brake;

controllably supplying a predetermined modulated amount of power from said power source to said traction motor and producing a predetermined amount of motor torque;

receiving and storing a first angular wheel rotation signal from said transducer means after a first predetermined period of time has elapsed;

receiving and storing a second angular wheel rotation signal from said transducer means after a second predetermined period of time has elapsed;

calculating the rotation angle through which said vehicle wheel rotates during the interval between receiving said first and second wheel rotation signals; and producing a first brake status signal in response to said calculated rotation angle being less than a predetermined amount, and a second brake status signal in response to said calculated rotation angle being not less than said preteterminded amount.

7. Apparatus, as set forth in claim 6, including electromagnetic signal transceiver means for receiving a remotely generated brake test command signal, delivering said brake test command signal to said processor means, receiving said produced brake status signal from said processor means, and transmitting said brake status signal via electromagnet radiation.

8. Apparatus, as set forth in claim 7, wherein said processor means receives said brake test command signal and responsively produces said brake engaging control signal.

9. A method for controllably testing the brakes of a wheeled vehicle, said vehicle having a source of power, a traction motor controllably connected to said power source and to at least one vehicle wheel, a vehicle brake associated with at least one vehicle wheel, and a wheel rotation angle transducer connected to at least one vehicle wheel, comprising the steps of:

engaging said vehicle brake;

supplying a predetermined modulated amount of power from said power source to said traction motor and producing a predetermined amount of motor torque;

receiving and storing a first wheel rotation angle signal from said wheel rotation transducer at a first predetermined time;

receiving and storing a second wheel rotation angle signal from said wheel rotation transducer at a second predetermined time subsequent to said first predetermined time;

calculating the angle through which said vehicle wheel rotates during the interval between receiving said first and second wheel rotation signals; and producing a first break status signal in response to said rotation angle being less than a predetermind amount, and a second break status signal in response to said rotation angle being not less than said predetermined amount.

* * * * *